(12) United States Patent  (10) Patent No.: US 7,857,446 B2
Dreher  (45) Date of Patent: Dec. 28, 2010

(54) EYEGLASS MANUFACTURING METHOD USING VARIABLE INDEX LAYER

(75) Inventor: Andreas W. Dreher, Escondido, CA (US)

(73) Assignee: Ophthonix, Inc., Vista, CA (US)

( * ) Notice: Subject to any disclaimer, the term of this patent is extended or adjusted under 35 U.S.C. 154(b) by 465 days.

(21) Appl. No.: 11/338,091

(22) Filed: Jan. 24, 2006

(65) Prior Publication Data

US 2006/0119792 A1    Jun. 8, 2006

Related U.S. Application Data

(60) Continuation of application No. 10/946,384, filed on Sep. 20, 2004, now Pat. No. 7,021,764, which is a division of application No. 10/773,667, filed on Feb. 6, 2004, now Pat. No. 6,840,619, which is a continuation of application No. 10/044,304, filed on Oct. 25, 2001, now Pat. No. 6,712,466.

(51) Int. Cl.
G02C 7/02 (2006.01)
(52) U.S. Cl. ....................... 351/159; 351/168
(58) Field of Classification Search ............... 351/41, 351/159, 160 R, 161, 168, 166, 652–654; 359/652–654, 41, 159, 160 R, 161, 168, 166
See application file for complete search history.

(56) References Cited

U.S. PATENT DOCUMENTS

| | | | |
|---|---|---|---|
| 3,485,556 A | 12/1969 | Naujokas |
| 3,718,383 A | 2/1973 | Moore |
| 3,933,411 A | 1/1976 | Winner |
| 3,973,837 A | 8/1976 | Page |
| 4,022,855 A | 5/1977 | Hamblen |
| 4,257,988 A | 3/1981 | Matos et al. |
| 4,268,133 A | 5/1981 | Fischer et al. |
| 4,422,733 A | 12/1983 | Kikuchi et al. |
| 4,666,236 A | 5/1987 | Mikami et al. |
| 4,711,576 A | 12/1987 | Ban |
| 4,778,256 A | 10/1988 | Serizawa |

(Continued)

FOREIGN PATENT DOCUMENTS

EP    0 077 168    3/1986

(Continued)

OTHER PUBLICATIONS

International Preliminary Examination Report issued on Feb. 20, 2004 for application No. PCT/US02/34334.

(Continued)

*Primary Examiner*—Joseph Martinez
*Assistant Examiner*—James R Greece
(74) *Attorney, Agent, or Firm*—Morrison & Foerster LLP

(57) ABSTRACT

An eyeglass lens and manufacturing method using epoxy aberrator includes two lenses with a variable index material, such as epoxy, sandwiched in between. The epoxy is then cured to different indexes of refraction that provide precise corrections for the patient's wavefront aberrations. The present invention further provides a method to produce an eyeglass that corrects higher order aberrations, such as those that occur when retinal tissue is damaged due to glaucoma or macular degeneration. The manufacturing method allows for many different applications including, but not limited to, supervision and transition lenses.

17 Claims, 8 Drawing Sheets

U.S. PATENT DOCUMENTS

| | | | |
|---|---|---|---|
| 4,810,070 A | 3/1989 | Suda et al. | |
| 4,869,587 A | 9/1989 | Breger | |
| 4,874,234 A | 10/1989 | Wichterle | |
| 4,883,548 A * | 11/1989 | Onoki | 156/99 |
| 4,944,584 A | 7/1990 | Maeda et al. | |
| 4,969,729 A | 11/1990 | Merle | |
| 4,996,123 A | 2/1991 | Nomura et al. | |
| 5,033,838 A | 7/1991 | Bonbon et al. | |
| 5,062,702 A | 11/1991 | Bille | |
| 5,080,472 A | 1/1992 | Gupta | |
| 5,080,477 A | 1/1992 | Adachi | |
| 5,100,589 A | 3/1992 | Ticknor | |
| 5,114,628 A | 5/1992 | Hofer et al. | |
| 5,116,684 A | 5/1992 | Fretz, Jr. et al. | |
| 5,148,205 A | 9/1992 | Guilino et al. | |
| 5,157,746 A | 10/1992 | Tobita et al. | |
| 5,164,750 A | 11/1992 | Adachi | |
| 5,198,844 A | 3/1993 | Roffman et al. | |
| 5,229,797 A | 7/1993 | Futhey et al. | |
| 5,266,352 A | 11/1993 | Filas et al. | |
| 5,276,693 A | 1/1994 | Long et al. | |
| 5,296,305 A | 3/1994 | Baude et al. | |
| 5,343,260 A | 8/1994 | Henry et al. | |
| 5,372,755 A | 12/1994 | Stoerr et al. | |
| 5,433,810 A | 7/1995 | Abrams | |
| 5,448,312 A | 9/1995 | Roffman et al. | |
| 5,512,371 A * | 4/1996 | Gupta et al. | 428/412 |
| 5,528,321 A | 6/1996 | Blum et al. | |
| 5,531,940 A * | 7/1996 | Gupta et al. | 264/1.7 |
| 5,585,968 A | 12/1996 | Guhman et al. | |
| 5,606,378 A | 2/1997 | Van Meurs | |
| 5,608,471 A | 3/1997 | Miller | |
| 5,617,154 A | 4/1997 | Hoffman | |
| 5,638,479 A | 6/1997 | Takami et al. | |
| 5,650,837 A | 7/1997 | Roffman et al. | |
| 5,715,031 A | 2/1998 | Roffman et al. | |
| 5,728,156 A | 3/1998 | Gupta et al. | |
| 5,771,088 A | 6/1998 | Perrott | |
| 5,777,719 A | 7/1998 | Williams et al. | |
| 5,786,883 A | 7/1998 | Miller et al. | |
| 5,835,192 A | 11/1998 | Roffman et al. | |
| 5,861,934 A * | 1/1999 | Blum et al. | 351/169 |
| 5,864,379 A | 1/1999 | Dunn | |
| 5,872,613 A | 2/1999 | Blum et al. | |
| 5,880,809 A | 3/1999 | Lieberman et al. | |
| 5,929,969 A | 7/1999 | Roffman | |
| 5,949,521 A | 9/1999 | Williams et al. | |
| 5,953,098 A | 9/1999 | Lieberman et al. | |
| 5,956,183 A | 9/1999 | Epstein et al. | |
| 5,963,300 A | 10/1999 | Horwitz | |
| 5,986,818 A | 11/1999 | Hasimura | |
| 5,998,096 A | 12/1999 | Umemoto et al. | |
| 6,007,204 A | 12/1999 | Fahrenkrug et al. | |
| 6,010,756 A | 1/2000 | Gasworth | |
| 6,028,723 A | 2/2000 | Smith | |
| 6,050,687 A | 4/2000 | Bille et al. | |
| 6,070,979 A * | 6/2000 | Kagei et al. | 351/159 |
| 6,081,632 A | 6/2000 | Yoshimura et al. | |
| 6,086,204 A | 7/2000 | Magnante | |
| 6,089,711 A | 7/2000 | Blankenbecler et al. | |
| 6,095,651 A | 8/2000 | Williams et al. | |
| 6,109,749 A | 8/2000 | Bernstein | |
| 6,112,114 A | 8/2000 | Dreher | |
| 6,120,150 A | 9/2000 | Sarver et al. | |
| 6,155,684 A | 12/2000 | Bille et al. | |
| 6,176,580 B1 | 1/2001 | Roffman et al. | |
| 6,199,986 B1 | 3/2001 | Williams et al. | |
| 6,224,211 B1 | 5/2001 | Gordon | |
| 6,234,631 B1 | 5/2001 | Sarver et al. | |
| 6,240,226 B1 | 5/2001 | Presby et al. | |
| 6,256,098 B1 | 7/2001 | Rubinstein et al. | |
| 6,257,723 B1 | 7/2001 | Sarver et al. | |
| 6,270,221 B1 | 8/2001 | Liang et al. | |
| 6,271,915 B1 | 8/2001 | Frey et al. | |
| 6,274,288 B1 | 8/2001 | Kewitsch et al. | |
| 6,299,311 B1 | 10/2001 | Williams et al. | |
| 6,305,802 B1 | 10/2001 | Roffman et al. | |
| 6,319,433 B1 | 11/2001 | Kohan | |
| 6,338,559 B1 | 1/2002 | Williams et al. | |
| 6,379,005 B1 | 4/2002 | Williams et al. | |
| 6,379,008 B1 | 4/2002 | Chateau et al. | |
| 6,382,795 B1 | 5/2002 | Lai | |
| 6,394,605 B1 | 5/2002 | Campin et al. | |
| 6,396,588 B1 | 5/2002 | Sei | |
| 6,464,355 B1 | 10/2002 | Gil | |
| 6,499,843 B1 | 12/2002 | Cox et al. | |
| 6,721,043 B2 | 4/2004 | Platt et al. | |
| 6,786,599 B2 * | 9/2004 | Hayashi | 351/163 |
| 6,786,602 B2 | 9/2004 | Abitbol | |
| 6,813,082 B2 * | 11/2004 | Bruns | 359/589 |
| 6,830,712 B1 | 12/2004 | Roffman et al. | |
| 6,840,752 B2 | 1/2005 | Foreman et al. | |
| 6,917,416 B2 | 7/2005 | Platt et al. | |
| 7,021,764 B2 | 4/2006 | Dreher | |
| 7,188,950 B2 | 3/2007 | Dreher et al. | |
| 2001/0033362 A1 | 10/2001 | Sarver | |
| 2001/0035939 A1 | 11/2001 | Mihashi et al. | |
| 2001/0041884 A1 | 11/2001 | Frey et al. | |
| 2002/0047992 A1 | 4/2002 | Graves et al. | |
| 2002/0080464 A1 | 6/2002 | Bruns | |
| 2002/0196412 A1 | 12/2002 | Abitbol | |
| 2003/0128330 A1* | 7/2003 | Iori et al. | 351/159 |
| 2004/0008319 A1 | 1/2004 | Lai et al. | |
| 2004/0051846 A1 | 3/2004 | Blum et al. | |
| 2006/0119792 A1 | 6/2006 | Dreher | |

FOREIGN PATENT DOCUMENTS

| | | |
|---|---|---|
| EP | 0 340 091 | 11/1989 |
| EP | 0 472 384 | 8/1991 |
| EP | 0 949 529 | 4/1999 |
| FR | 1411976 | 9/1965 |
| FR | 2 661 914 | 11/1991 |
| GB | 1163002 | 9/1969 |
| JP | 57-046202 | 3/1982 |
| JP | 57-201216 | 12/1982 |
| JP | 60-175009 | 9/1985 |
| JP | 62295001 | 12/1987 |
| JP | 08294977 | 11/1996 |
| JP | 2000-506621 | 5/2000 |
| WO | WO-92/01417 | 6/1992 |
| WO | WO-93/21010 | 10/1993 |
| WO | WO-97/23804 | 7/1997 |
| WO | WO-97/38344 | 10/1997 |
| WO | WO-98/27863 | 7/1998 |
| WO | WO-98/53360 | 11/1998 |
| WO | WO-99/13361 | 3/1999 |
| WO | WO-00/19885 | 4/2000 |
| WO | WO-00/41650 | 7/2000 |
| WO | WO-01/02896 | 1/2001 |
| WO | WO-01/47449 | 7/2001 |
| WO | WO-01/61382 | 8/2001 |
| WO | WO-01/71411 | 9/2001 |
| WO | WO-01/82791 | 11/2001 |
| WO | WO-01/89424 | 11/2001 |
| WO | WO-02/09579 | 2/2002 |
| WO | WO-02/19901 | 3/2002 |
| WO | WO-02/28272 | 4/2002 |
| WO | WO-02/30273 | 4/2002 |
| WO | WO-02/32297 | 4/2002 |

OTHER PUBLICATIONS

Moretti, Opthamology News, Nov. 29, 2001.
Platt et al., Journal of Refractive Surgery (2001) 17 Sep./Oct.

OE Reports 164—Aug. 1997, from Holography (vol. 8, No. 1), the newsletter of the International Technical Working Group, "Making the switch to Dupont photopolymer".

Non-Final Office Action for U.S. Appl. No. 11/649,995, mailed on May 29, 2008, 7 pages.

European Search Report for EP 07008046.0, mailed on Jul. 11, 2007, 8 pages.

Notice of Reasons for Rejection for Japanese Patent Application No. 2003-537914, mailed on Aug. 12, 2008, 6 pages.

* cited by examiner

EYEGLASS MANUFACTURING METHOD USING VARIABLE INDEX LAYER

RELATED APPLICATION INFORMATION

This application is a continuation of U.S. patent application Ser. No. 10/946,384, filed Sep. 20, 2004, which is a divisional of U.S. patent application Ser. No. 10/773,667, filed Feb. 6, 2004, now U.S. Pat. No. 6,840,619, which is a continuation of U.S. patent application Ser. No. 10/044,304, filed Oct. 25, 2001, now U.S. Pat. No. 6,712,466, all of which are hereby incorporated by reference in their entireties.

BACKGROUND OF THE INVENTION

1. Field of the Invention

The present invention relates generally to an eyeglass manufacturing method using a layer with a variable index of refraction. More specifically, the present invention pertains to patient-specific spectacle lenses manufactured with an variable index aberrator in order to more accurately correct lower order aberrations and additionally correct higher order aberrations. The present invention also provides a means for correcting vision problems caused by retinal dysfunction.

2. Description of the Related Art

Present manufacturing techniques for eyeglass lenses are capable of producing lenses that correct only the lower order (sphere and cylinder) aberrations. Customarily, lens blanks are available in discrete steps of refractive power of 0.25 diopters. In most cases, these steps are too large to create optimum vision for a patient's eye.

Current manufacturing techniques do not effectively treat vision problems resulting from retinal dysfunction. For example, in macular degeneration, patients suffer from vision loss in selective areas of the fundus, typically close to the center of vision. Laser treatment of the affected areas further destroys retinal tissue, causing blindness at the treated areas. Clinical studies have shown that the human eye and brain are capable of switching to other areas of the retina to substitute the damaged area with an undamaged area. In other words, damaged areas in the retina are essentially bypassed by the brain. Ultimately, vision loss will occur as a portion of an image falls on the damaged retina. Consequently, there is a need to manufacture an eyepiece such that the image may be "warped" around the dysfunctional tissue in order to allow the entire image to focus on the remaining healthy tissue.

In light of the aforementioned problems, the need for an optical element which generates a unique wavefront phase profile becomes apparent. Traditional manufacturing methods create such profiles through grinding and polishing. Such a method of manufacture is very costly due to the amount of time and expertise required.

SUMMARY OF THE PRESENT INVENTION

The present invention utilizes the technology developed by the wavefront aberrator in which a layer of variable index material, such as curable epoxy, can be sandwiched between two plane or curved glass or plastic plates. This sandwich is then exposed to the curing radiation (i.e., UV light) that is modulated spatially or temporally in order to create spatially resolved variations of refractive indices. This will allow the manufacturing of a lens that is capable of introducing or compensating for low and high order aberrations.

In the simplest form, two lens blanks are sandwiched together with a layer of epoxy such that the lenses used in conjunction approximately correct the patient's refractive spherical and cylindrical correction to within 0.25 diopters. Subsequently, the epoxy aberrator would be exposed to curing radiation in a pre-programmed way in order to fine-tune the refractive properties of the spectacle lens to the exact spherical and cylindrical prescription of the patient's eye.

Another application of the present invention is to manufacture multi-focal or progressive addition lenses constructed with a layer of variable index material sandwiched in between the two lens blanks. The drawback of progressive addition lenses today is that, like regular spectacle lenses, a true customization for a patient's eye cannot be achieved due to the current manufacturing techniques. Using the two lenses and epoxy, a customized progressive addition lens or reading lens can be manufactured by appropriately programming the curing of the epoxy aberrator.

The present invention provides an opportunity to manufacture lenses that give patients "supervision." In order to achieve supervision, higher order aberrations of the patient's eye need to be corrected. Since these higher order aberrations, unlike the spherical and cylindrical refractive error, are highly asymmetrical, centering of the eye's optical axis with the zone of higher order correction ("supervision zone") is important. To minimize this effect, one could devise a spectacle lens that incorporates a supervision zone only along the central optical axis, allowing the patient to achieve supervision for one or more discrete gazing angles. The remainder of the lens would then be cured to correct only the lower order aberrations. An optional transition zone could be created between the supervision zone and the normal vision zone allowing for a gradual reduction of higher order aberrations. Again, all of this would be achieved by spatially resolved programming of the epoxy aberrator's curing.

In order to cover a larger field of view with supervision, a multitude of supervision "islands" might be created. The supervision islands then are connected by transition zones that are programmed to gradually change the higher order aberrations in order to create smooth transitions.

In bifocal lenses, refractive power in discrete steps of 1 diopter is added in the lower area of the lens to aid the spectacle wearer in near distance viewing, i.e. reading. For cosmetic reasons, the visible dividing line between the distance viewing area and the reading area is disliked by many presbyobic patients. With the event of the progressive addition lens, the sharp dividing line between the distance area and the reading area has been eliminated by introducing a continuous varifocal corridor of vision with a refractive power slowly changing from the distance viewing prescription to the reading prescription.

However, due to manufacturing limitations several disadvantages exist with the progressive addition lens. First, vision through areas outside the corridor is noticeably distorted, making the progressive addition lens unsuitable for many patients. Second, while the patient's individual prescription is applied to the distance viewing area, the added refractive power for the reading area is only offered in discrete steps of 1 diopter. Third, the distance between the centers of the distance viewing and reading viewing areas is fixed by the lens design and cannot be changed to accommodate for an individual's preference or application. Furthermore, the corridor design is fixed for any particular brand of lens and cannot be changed according to the patient's actual viewing preferences or spectacle frame selected.

Therefore, when prescribing a progressive addition lens, the eye care professional has to choose from an assortment of designs and manufacturers of the lens which matches the requirements of the patient most closely. The present invention allows one to manufacture a lens that is entirely customized and optimized to the patient's individual requirements.

Lastly, the present invention may be used to "warp" the retinal image so that damaged portions of the retina will be bypassed by the image. In order to do this, the visual field of the patient needs to be mapped with a perimeter or microperimeter. From this map of healthy retina, spectacle lenses could be manufactured using the epoxy aberrator.

DESCRIPTION OF THE DRAWINGS

The novel features of this invention, as well as the invention itself, both as to its structure and its operation, will be best understood from the accompanying drawings, taken in conjunction with the accompanying description, in which like reference characters refer to similar parts, and in which.

DETAILED DESCRIPTION OF THE PREFERRED EMBODIMENT

Figure 1:
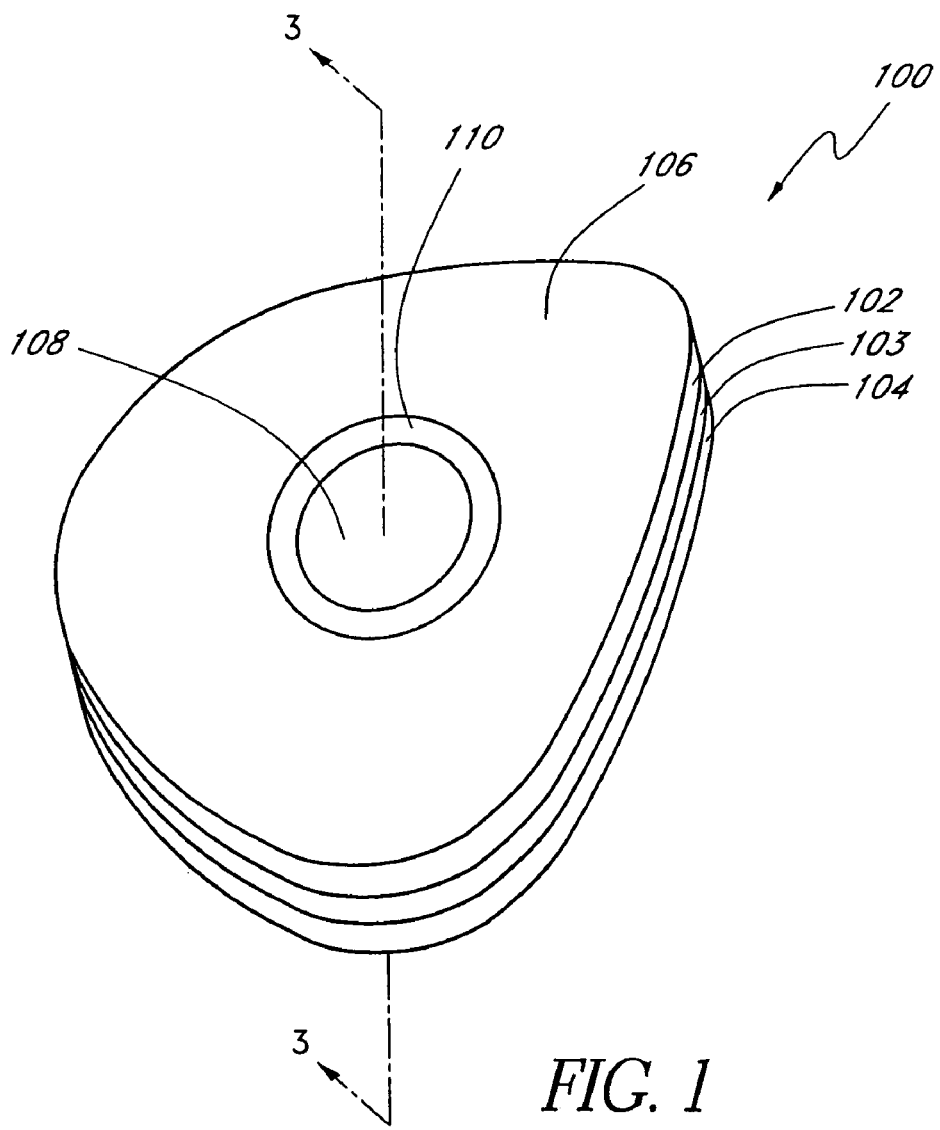
FIG. 1 is a perspective view of an eyeglass that incorporates a supervision zone for long distance applications.

Referring initially to FIG. 1, a lens assembly that incorporates a supervision zone is shown and generally designated 100. FIG. 1 shows that the lens assembly 100 includes an upper lens 102, a variable index layer 103, and a lower lens 104. In a preferred embodiment, the variable index layer is made of ultra-violet curing epoxy which exhibits an index of refraction that can be changed by exposure to ultraviolet radiation. However, it is to be appreciated that other materials which exhibit similar characteristics, namely a variable index of refraction, may be incorporated into the present invention without departing from the spirit of the invention.

The variable index layer 103 makes up the normal vision zone 106, the transition zone 110, and the supervision zone 108, where the epoxy at each zone is cured to a specific index of refraction. The normal vision zone 106 corrects the lower order spherical and cylindrical aberrations of the patient's eye. The transition zone 110 allows for a gradual reduction of higher order aberrations. The supervision zone 108 lies along the patient's optical axis (not shown) and corrects the higher order aberrations allowing the patient to achieve supervision for one or more discrete gazing angles. The shape of the lens 100 is meant to be exemplary of the shape of a typical eyeglass lens, and any shape, including highly curved lenses, may be used while not departing from the present invention.

Figure 2:
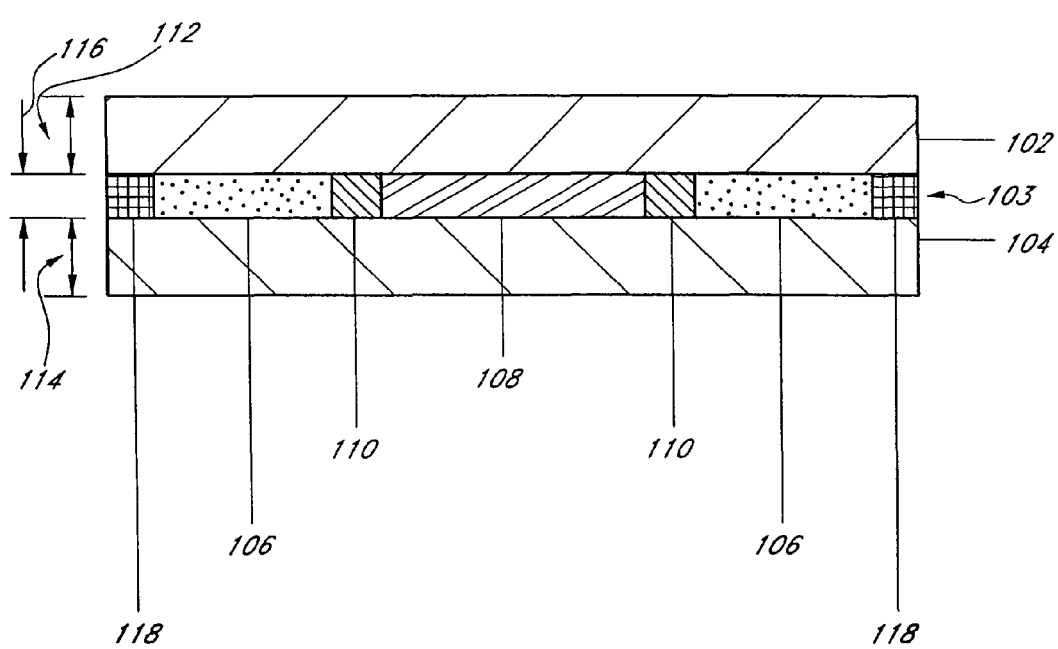
FIG. 2 shows a cross sectional view of FIG. 1.

Referring now to FIG. 2, a cross section of lens 100 is represented such that upper lens 102 has a thickness 112, epoxy layer 103 has a thickness 116, and the lower lens 104 has a thickness 114. The epoxy layer 103 is sandwiched between the upper lens 102 and the lower lens 104 and is held in place by a stopper 118.

Figure 3:
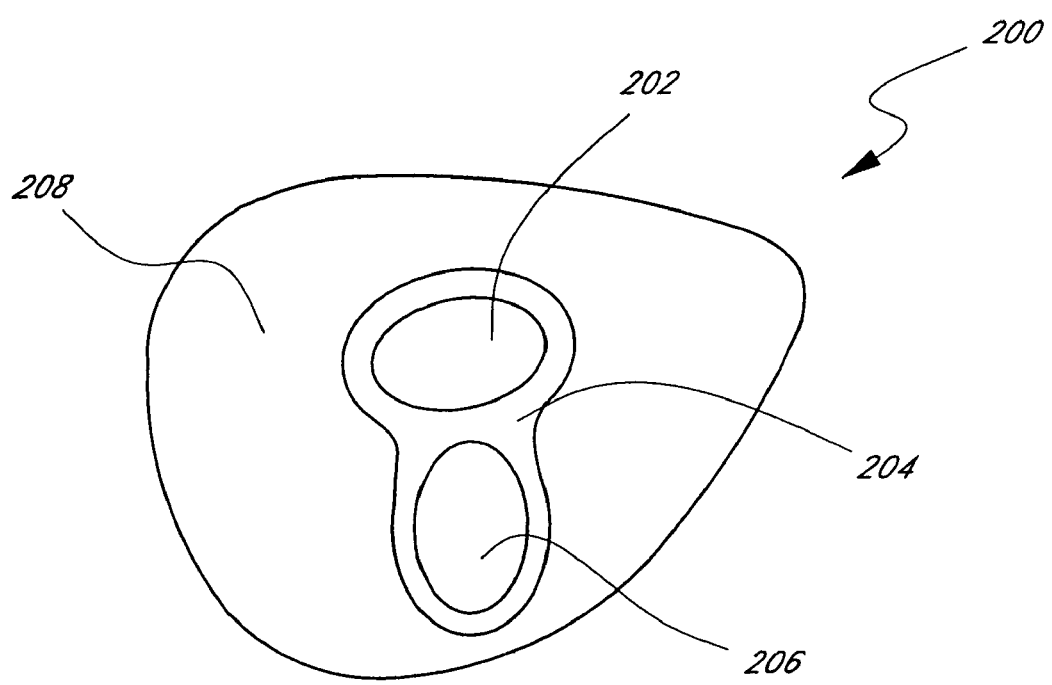
FIG. 3 shows a top view of a progressive addition lens, which includes a supervision zone and reading zone.

Referring now to FIG. 3, an alternative embodiment of the present invention is illustrated as a progressive addition lens and generally designated 200. FIG. 3 shows a top view of a transition lens 200 in which there is a supervision zone 202, a transition zone 204, and a short distance viewing zone 206. The normal vision zone 208 of the progressive addition lens 200 is corrected for the lower aberrations. Again, the creation of the various vision zones is by means of selectively curing the epoxy aberrator sandwiched between two glass (or plastic) blanks, not through the traditional means of grinding or molding these features into a blank. The transition lens 200 has a similar cross section to that depicted in FIG. 2.

Figure 4:
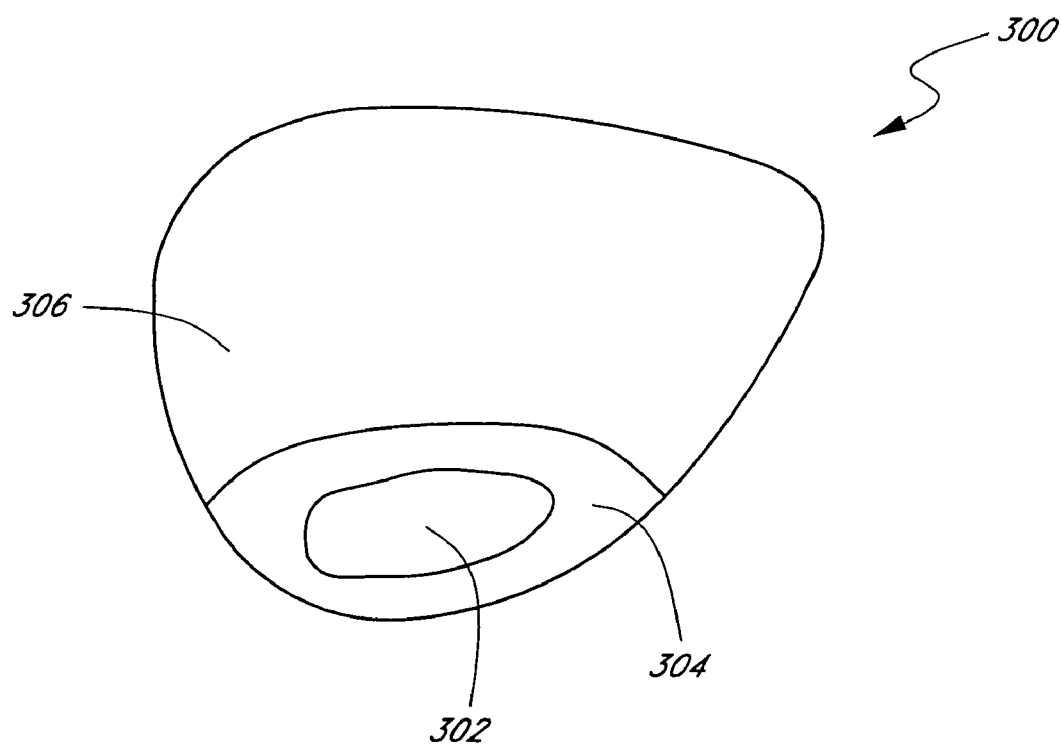
FIG. 4 shows a top view of a reading or special application lens.

Referring now to FIG. 4, another alternative embodiment of the present invention is illustrated as a reading lens and generally designated 300. FIG. 4 shows a top view of a reading lens 300 in which there is a supervision zone 302, a transition zone 304, and a normal vision zone 306. The reading lens 300 has a similar cross section to that depicted in FIG. 2. The supervision zone 302 may be used for, but not limited to, high-resolution applications such as reading, precision close up work, etc.

Figure 5A:
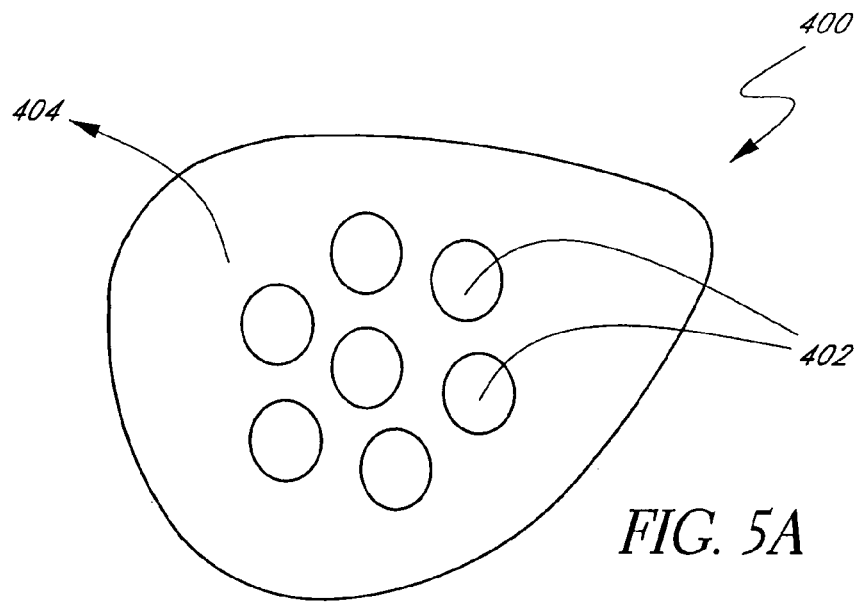
FIG. 5A shows a top view of a lens including a multitude of supervision islands, which cover a larger view with supervision.

Referring now to FIG. 5A, an alternative embodiment of the present invention is illustrated as a supervision lens that covers a larger field of view and is generally designated 400. FIG. 5A shows a top view of a supervision lens 400 in which there is a plurality of supervision islands 402, and a transition zone 404. The plurality of supervision islands 402 create a larger field of view for the patient, while the transition zone 404 is manufactured to gradually change the higher order aberrations in order to create smooth transitions.

Figure 5B:
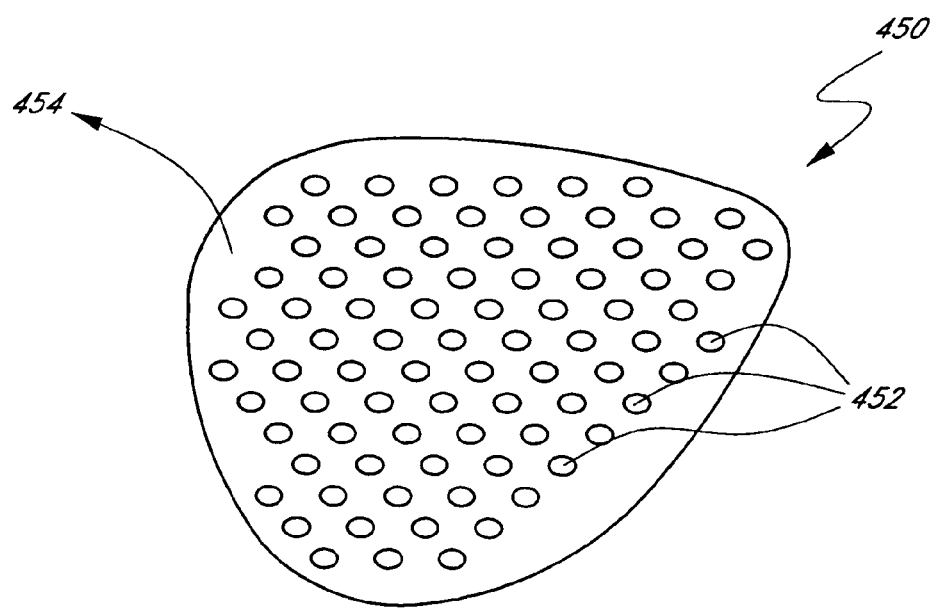
FIG. 5B shows a top view of a multi-focal lens including a multitude of reading islands, allowing for far vision correction and simultaneous reading correction.

Referring now to FIG. 5B, another alternative embodiment of the present invention is illustrated as a multi-focal lens that allows for simultaneous correction for far vision and reading vision and is generally designated 450. FIG. 5B shows a top view of a multi-focal lens 450 in which there is a plurality of optical islands 452, each representing the patient's reading prescription while the background zone 454 represents the patient's far vision prescription, or vice versa. Ideally, the diameter of the optical islands is on the order of 100 microns so that a maximum number of optical islands falls within the typical pupil size of 2 to 6 mm diameter.

Figure 7:
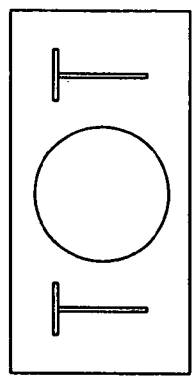
FIG. 7 shows the image of the sane object as FIG. 6 from the patient's perspective.
Figure 8:
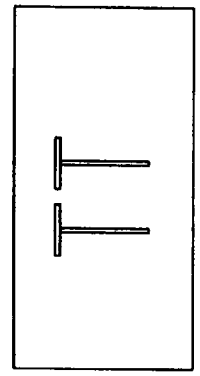
FIG. 8 shows the patient's view of the image after the brain shuts down the damaged retina.
Figure 6:
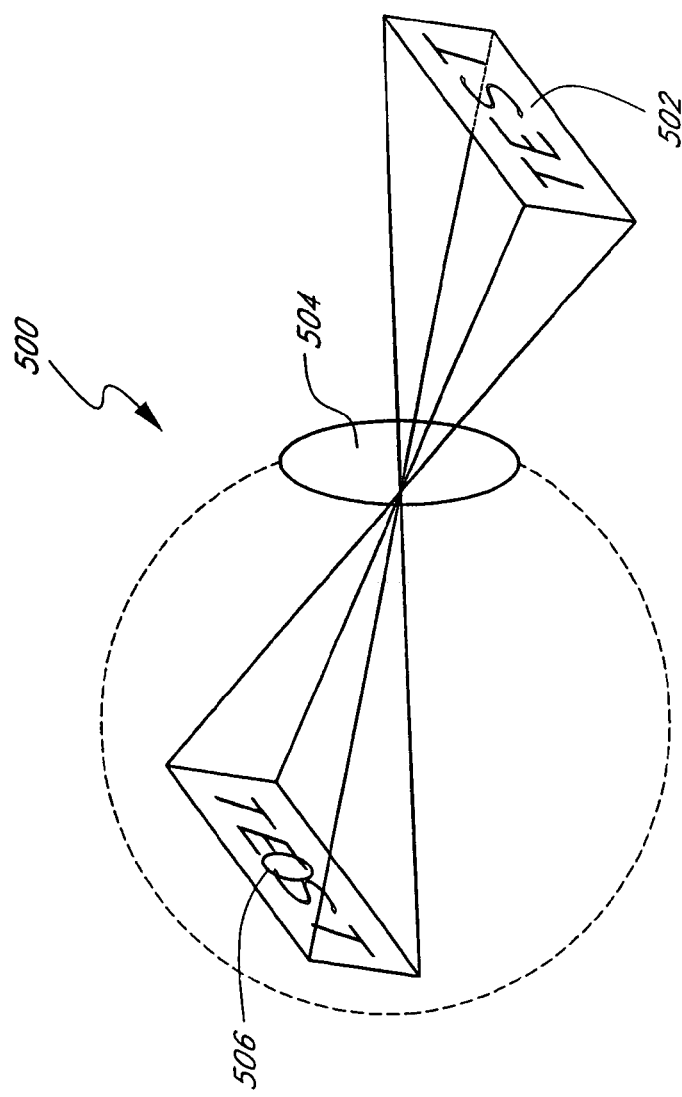
FIG. 6 shows a text object imaged onto a damaged retina.
Figure 10:
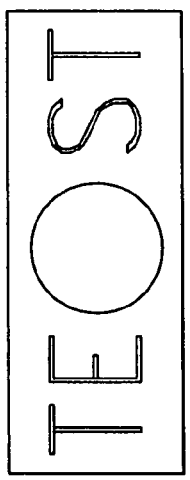
FIG. 10 shows the image as the patient initially sees it.
Figure 11:
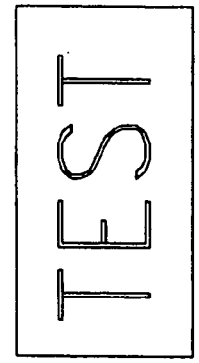
FIG. 11 shows the image as the patient sees it after the brain shuts down the damaged retina.
Figure 9:
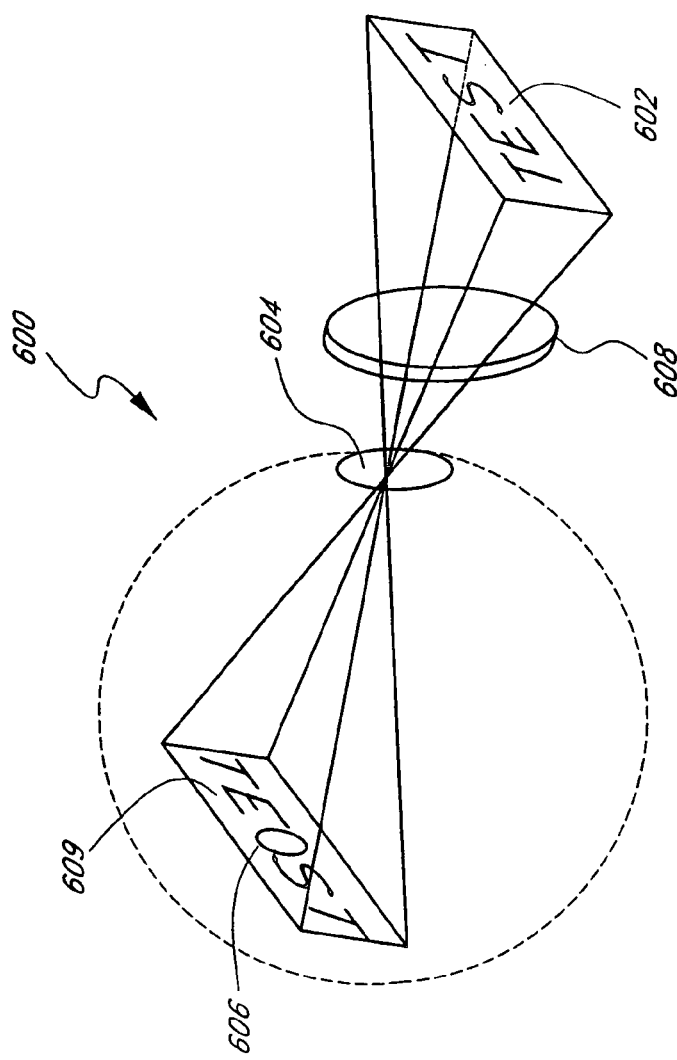
FIG. 9 shows an image focused on a damaged retina, with a corrective lens in place.

One special application of this invention is the use for correcting vision problems caused by retinal dysfunction, e.g., by eye diseases like glaucoma or macular degeneration. FIG. 6 shows an eye generally designated 500, in which an image 502 is imaged by the eye's cornea and lens 504 onto the inner surface of the eye 500 where there is damaged retinal tissue 506. The patient initially sees only a portion of the image and an obstruction, as shown in FIG. 7. Eventually the brain shuts off the damaged portion of the retina and the patient's view no longer includes the obstruction, such a view is represented in FIG. 8. Although the patient no longer sees an obstruction, a portion of the image remains unseen. The present invention is capable of correcting this phenomenon as illustrated in FIGS. 9-11. FIG. 9 again shows an eye generally designated 600, in which an object 602 is imaged through the eye's cornea and lens 604 onto the inner surface of the eye 600 where there is damaged retinal tissue 606. However, a lens 608 manufactured using the epoxy wavefront aberrator is placed in front of the eye 600. The retinal image 609 of the object 602 is warped around damaged retinal tissue 606 such that none of the image 602 is lost. FIG. 10 shows the image the patient sees. As previously mentioned, over time the brain will terminate the signals generated by the damaged retinal tissue 606 and the patient will see the entire image 602 as shown in FIG. 11.

Figure 12:
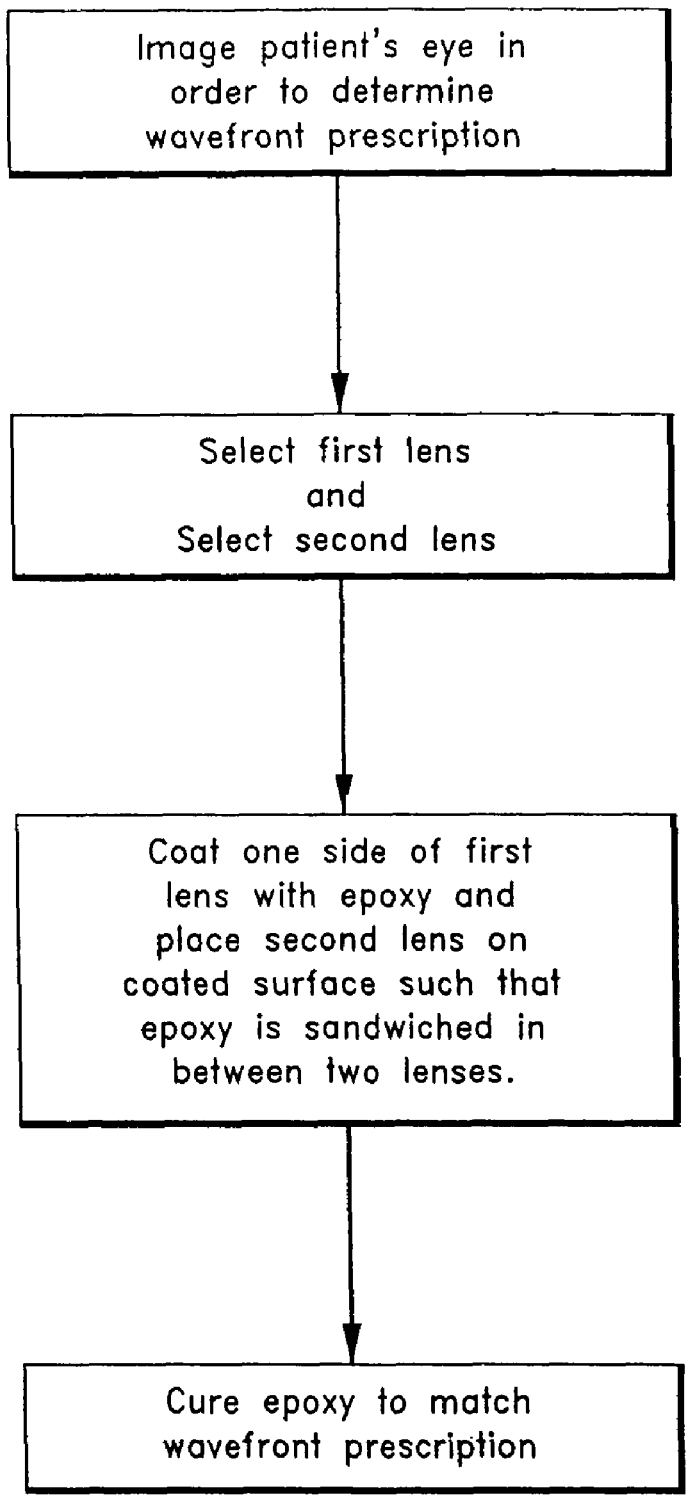
FIG. 12 shows a sequence of manufacture for the present invention.

FIG. 12 shows a flow chart in which the manufacturing steps of the present invention are disclosed and generally designated 700. First the patient's eye must be imaged in order to determine the wavefront prescription. Second, both the upper and lower lenses must be selected. This selection corrects both the patient's spherical and cylindrical aberrations to within 0.25 diopters. Next, one side of the first lens is coated with epoxy. The second lens in then placed on the epoxy coated surface of the first lens, such that the epoxy is sandwiched between the two lenses. Finally the epoxy is cured to match the wavefront prescription.

While the different embodiments of the present invention as herein shown and disclosed in detail is fully capable of obtaining the objects and providing the advantages herein before stated, it is to be understood that it is merely illustrative of a preferred embodiment and an alternative embodiment of the invention and that no limitations are intended to the details of construction or design herein shown other than as described in the appended claims.

What is claimed is:

1. An eyeglass lens, comprising:
   a first layer comprising a first lens;
   a second layer comprising a material having a varying index of refraction, wherein the index of refraction of the material is varied by radiation curing; and
   a third layer comprising a second lens, the second layer being sandwiched between the first layer and the third layer;
   wherein at least one of the first and third layers is configured to substantially correct at least a first aberration of a patient's eye selected from the group consisting of spherical aberration and cylindrical aberration, and the second layer comprises at least one super vision zone and at least one normal vision zone, wherein the super vision zone is configured to correct at least one higher order aberration of the patient's eye and the normal vision zone does not correct higher order aberrations of the patient's eye.

2. The eyeglass lens of claim 1 wherein the second layer further comprises a transition zone configured to provide a gradual reduction of higher order aberration correction between the super-vision zone and the normal vision zone of the second layer.

3. The eyeglass lens of claim 1 wherein the eyeglass lens is a progressive addition lens.

4. The eyeglass lens of claim 3 wherein the second layer comprises a short distance viewing zone.

5. The eyeglass lens of claim 3 wherein the first aberration of the patient's eye comprises a lower order aberration.

6. An eyeglass lens, comprising:
   a first layer comprising a first lens;
   a second layer comprising a material having a varying index of refraction, wherein the index of refraction of the material is varied by radiation curing;
   a third layer comprising a second lens, the second layer being sandwiched between the first layer and the third layer;
   the second layer comprising a plurality of vision zones, each vision zone being configured to correct at least part of a plurality of different aberrations of the patient's eye, wherein at least one vision zone represents a supervision zone configured to correct for one or more higher order aberrations and at least one vision zone represents a normal vision zone that does not correct for a higher order aberration; and
   the second layer further comprising at least one transition zone configured to provide a gradual reduction of higher order aberration correction from the at least one supervision zone to at least one normal vision zone.

7. The eyeglass lens of claim 6 in which the plurality of vision zones comprises at least a first vision zone and a second vision zone, each of the first vision zone and the second vision zone being independently selected from the group consisting of
   a vision zone configured to correct at least part of a far vision aberration, and
   a vision zone configured to correct at least part of a near vision aberration.

8. The eyeglass lens of claim 6 wherein the plurality of vision zones comprises at least two vision zones, each of which is independently configured to substantially correct at least a high order aberration.

9. The eyeglass lens of claim 6 wherein the plurality of vision zones comprises at least two vision zones, each of which is independently configured to substantially correct at least a low order aberration.

10. The eyeglass lens of claim 6 wherein the at least one transition zone is configured to provide a gradual reduction of higher order aberration correction between a first vision zone configured to correct at least part of the plurality of different aberrations of the patient's eye for a first gazing angle and a second vision zone configured to correct at least part of the plurality of different aberrations of the patient's eye for a second gazing angle.

11. The eyeglass lens of claim 10 wherein the plurality of different aberrations comprises at least one aberration selected from the group consisting of low order aberration and high order aberration.

12. The eyeglass lens of claim 6 wherein the lens comprises a multi-focal lens.

13. The eyeglass lens of claim 6 wherein the lens comprises a reading lens.

14. The eyeglass lens of claim 6 wherein the lens comprises a progressive addition lens.

15. The eyeglass lens of claim 6 wherein at least one of the first lens and the third lens is configured to substantially correct a low order aberration.

16. The eyeglass lens of claim 6 wherein at least one of the first lens and the third lens is configured to correct at least part of a low order aberration.

17. The eyeglass lens of claim 16 wherein the second layer is configured to correct at least part of the low order aberration.

* * * * *